United States Patent [19]
Hoogenboom et al.

[11] Patent Number: 5,675,387
[45] Date of Patent: Oct. 7, 1997

[54] METHOD AND APPARATUS FOR EFFICIENT ADDRESSING OF DRAM IN A VIDEO DECOMPRESSION PROCESSOR

[75] Inventors: Chris Hoogenboom, La Jolla; Bao Vuong, San Diego, both of Calif.

[73] Assignee: General Instrument Corporation of Delaware, Chicago, Ill.

[21] Appl. No.: 687,319

[22] Filed: Jul. 25, 1996

Related U.S. Application Data

[63] Continuation of Ser. No. 290,372, Aug. 15, 1994, abandoned.

[51] Int. Cl.$^6$ .................................................. H04N 7/18
[52] U.S. Cl. .................... 348/416; 348/416; 348/415; 348/411; 348/409; 348/720; 348/721; 348/715; 348/710
[58] Field of Search ........................... 348/715, 716, 348/416, 415, 419, 411, 409, 405, 402, 721, 720

[56] References Cited

U.S. PATENT DOCUMENTS

| | | | |
|---|---|---|---|
| 5,170,259 | 12/1992 | Niihara | 348/416 |
| 5,226,093 | 7/1993 | Iwase | 348/405 |
| 5,267,334 | 11/1993 | Normille et al. | 348/420 |
| 5,293,593 | 3/1994 | Hodge et al. | 395/400 |
| 5,315,388 | 5/1994 | Shen et al. | 348/715 |
| 5,379,070 | 1/1995 | Retter et al. | 348/716 |
| 5,379,356 | 1/1995 | Purcell et al. | 348/711 |
| 5,384,581 | 1/1995 | Ikeda | 348/716 |
| 5,386,233 | 1/1995 | Keith | 348/717 |
| 5,398,072 | 3/1995 | Auld | 348/426 |
| 5,406,311 | 4/1995 | Michelson | 348/448 |

OTHER PUBLICATIONS

Preliminary Data Sheet entitled "MPEG-2/DCII Video Decompression Processor," ©Motorola Microprocessor and Memory Technologies Group, 1994, Document MC68VDP/D.

*Primary Examiner*—Tommy P. Chin
*Assistant Examiner*—Anand Rao
*Attorney, Agent, or Firm*—Barry R. Lipsitz; Ralph F. Hoppin

[57] ABSTRACT

Pixel data is stored and subsequently read from a random access memory of a video decompression processor in a manner that reduces the number of times different rows of the RAM must be addressed in order to retrieve portions of the pixel data therefrom. Pixel data from a video frame is stored in the RAM as a plurality of pages. Each page substantially fills a different row of the RAM and corresponds to a different section of the video frame. A motion vector is decoded to determine the location of a prediction area within the video frame. In the event that the prediction area encompasses more than one of the pages of the video frame, the pixel data is retrieved one page at a time, minimizing the number of row changes required when addressing the RAM to retrieve the data.

19 Claims, 10 Drawing Sheets

METHOD AND APPARATUS FOR EFFICIENT ADDRESSING OF DRAM IN A VIDEO DECOMPRESSION PROCESSOR

This application is a continuation of commonly assigned U.S. patent application Ser. No. 08/290,372 filed Aug. 15, 1994, now abandoned.

BACKGROUND OF THE INVENTION

The present invention relates to a video decompression processor, and more particularly to an efficient scheme for addressing a dynamic random access memory (DRAM) in such a processor to reduce the number of times that different rows of the DRAM must be addressed in order to retrieve prior video frame pixel data necessary to reconstruct a current video frame.

Digital transmission of television signals can deliver video and audio services of much higher quality than analog techniques. Digital transmission schemes are particularly advantageous for signals that are broadcast via a cable television network or by satellite to cable television affiliates and/or directly to home satellite television receivers. It is expected that digital television transmitter and receiver systems will replace existing analog systems just as digital compact discs have replaced analog phonograph records in the audio industry.

A substantial amount of digital data must be transmitted in any digital television system. In a digital television system, a subscriber receives the digital data stream via a receiver/descrambler that provides video, audio and data to the subscriber. In order to most efficiently use the available radio frequency spectrum, it is advantageous to compress the digital television signals to minimize the amount of data that must be transmitted.

The video portion of a television signal comprises a sequence of video "frames" that together provide a moving picture. In digital television systems, each line of a video frame is defined by a sequence of digital data bits referred to as "pixels." A large amount of data is required to define each video frame of a television signal. For example, 7.4 megabits of data is required to provide one video frame at NTSC (National Television System Committee) resolution. This assumes a 640 pixel by 480 line display is used with eight bits of intensity value for each of the primary colors red, green and blue. At PAL (phase alternating line) resolution, 9.7 megabits of data is required to provide one video frame. In this instance, a 704 pixel by 576 line display is used with eight bits of intensity value for each of the primary colors red, green and blue. In order to manage this amount of information, the data must be compressed.

Video compression techniques enable the efficient transmission of digital video signals over conventional communication channels. Such techniques use compression algorithms that take advantage of the correlation among adjacent pixels in order to derive a more efficient representation of the important information in a video signal. The most powerful compression systems not only take advantage of spacial correlation, but can also utilize similarities among adjacent frames to further compact the data. In such systems, differential encoding is usually used to transmit only the difference between an actual frame and a prediction of the actual frame. The prediction is based on information derived from a previous frame of the same video sequence.

Examples of video compression systems using motion compensation can be found in Krause, et al. U.S. Pat. No. 5,057,916; 5,068,724; 5,091,782; 5,093,720; and 5,235,419.

Generally, such motion compensation systems take advantage of a block-matching motion estimation algorithm. In this case, a motion vector is determined for each block in a current frame of an image by identifying a block in a previous frame which most closely resembles the particular current block. The entire current frame can then be reconstructed at a decoder by sending the difference between the corresponding block pairs, together with the motion vectors that are required to identify the corresponding pairs. Often, the amount of transmitted data is further reduced by compressing both the displaced block differences and the motion vector signals. Block matching motion estimating algorithms are particularly effective when combined with block-based spatial compression techniques such as the discrete cosine transform (DCT).

Each of a succession of digital video frames that form a video program can be categorized as an intra frame (I-frame), predicted frame (P-frame), or B-frame. The prediction is based upon the temporal correlation between successive frames. Portions of frames do not differ from one another over short periods of time. The encoding and decoding methods differ for each type of picture. The simplest methods are those used for I-frames, followed by those for P-frames and then B-frames.

I-frames completely describe a single frame without reference to any other frame. For improved error concealment, motion vectors can be included with an I-frame. An error in an I-frame has the potential for greater impact on the displayed video since both P-frames and B-frames are predicted from an I-frame.

P-frames are predicted based on previous I or P frames. The reference is from an earlier I or P frame to a future P-frame and is therefore called "forward prediction." B-frames are predicted from the closest earlier I or P frame and the closest later I or P frame. The reference to a future picture (i.e., one that has not yet been displayed) is called "backward prediction." There are cases where backward prediction is very useful in increasing the compression rate. For example, in a scene in which a door opens, the current picture may predict what is behind the door based upon a future picture in which the door is already open.

B-frames yield the most compression but also incorporate the most error. To eliminate error propagation, B-frames may never be predicted from other B-frames. P-frames yield less error and less compression. I-frames yield the least compression, but are able to provide random access entry points into a video sequence.

One standard that has been adopted for encoding digital video signals is the Motion Picture Experts Group (MPEG) standard, and more particularly the MPEG-2 standard. This standard does not specify any particular distribution that I-frames, P-frames and B-frames must take within a sequence. Instead, the standard allows different distributions to provide different degrees of compression and random accessibility. One common distribution is to have I-frames about every half second and two B-frames between successive I or P frames. To decode P frames, the previous I-frame must be available. Similarly, to decode B frames, the previous and future P or I frames must be available. Consequently, the video frames are encoded in dependency order, such that all pictures used for prediction are coded before the pictures predicted therefrom. Further details of the MPEG-2 standard (and the alternative DigiCipher®II standard) and its implementation in a video decompression processor can be found in document MC68VDP/D, a preliminary data sheet entitled "MPEG-2/DCII Video Decompression Processor," ®Motorola Microprocessor and Memory Technologies Group, 1994, incorporated herein by reference.

In order to implement video compression in practical systems, a video decompression processor is required for each digital television receiver. The development of very large scale integration (VLSI) integrated circuit chips is currently underway to implement such video decompression processors. In consumer products such as television sets, it is imperative that the cost of the system components be kept as low as possible. One of the significant costs associated with a video decompression processor is the random access memory (RAM) required to (i) buffer the compressed data prior to decompression, (ii) store the previous frame data necessary to predict a current frame using motion estimation techniques, and (iii) buffer the decompressed data prior to its output to a video appliance such as a television set, video tape recorder or the like.

The efficient utilization of the video data memory required by an MPEG-2 or DCII decompression processor, typically implemented in external DRAM, requires a scheme that can utilize a minimal amount of memory while maintaining the required data access rates (i.e., memory bandwidth). DRAMs are typically organized as an array of rows (also referred to as "pages") and columns. One of the rules of DRAM operation is that a change in row address results in a slow access for the first data of the new row. Thus, in order to maximize DRAM I/O bandwidth, it is desirable to read data such that it causes the minimum number of changes in the row address. Thus, it is advantageous to tailor the memory map to minimize row changes. To achieve this goal, it is advantageous to sequentially access data stored in random access memory. Such sequential accesses are fast and therefore desirable. Random accesses, on the other hand, which may require frequent changes in the row address, are slow and therefore undesirable.

In a video decompression processor, such as one conforming to the MPEG or DigiCipher®II (DCII) standards, various processes require DRAM access. These processes include prediction calculation, display, packet filter/video first-in first-out (FIFO) writes, and video syntax parsing/video FIFO reads. The requests for access to the DRAM made by these processes must be prioritized and serviced efficiently in a practical video decompression processor. Although ideally, all processes would be given access instantly, in reality only one process can have access to the DRAM at any given time. It would therefore be advantageous to provide a DRAM memory management scheme in a video decompression processor that prioritizes DRAM accesses and maximizes DRAM I/O bandwidth.

The present invention provides a video decompression processor having the aforementioned advantages, in which DRAM I/O bandwidth is improved using techniques including rate buffering, optimal address ordering, statistical averaging (i.e., decoding a video frame in one frame's time), DRAM request arbitration, and handshaking between decoding subprocesses.

SUMMARY OF THE INVENTION

In accordance with the present invention, a method is provided for storing and subsequently reading pixel data from a random access memory (RAM), such as DRAM, to reduce the number of times that different rows ("pages") of the RAM must be addressed in order to retrieve portions of the pixel data therefrom. The retrieved portions enable the reconstruction of a current video frame from a prior video frame represented by the pixel data. The prior video frame is stored in the RAM as a plurality of tiles. Each tile substantially fills a different row of the RAM and corresponds to a different section of the video frame having a height of M pixels and a width of N pixels. A motion vector is decoded to determine the location of a prediction area within the prior video frame. The prediction area has a height that is equivalent to the vertical space occupied by H pixels and a width equivalent to the horizontal space occupied by W pixels. In the event that the prediction area encompasses more than one of the tiles of the video frame (i.e., more than one row of the RAM), all of the pixel data from one tile bounded by the prediction area is retrieved from the corresponding RAM row before proceeding to retrieve the pixel data bounded by the prediction area from each subsequent tile. In this manner, all of the pixel data bounded by the prediction area is retrieved from the RAM one page at a time. Since each tile corresponds to one row of the RAM, this technique minimizes the number of times that different rows must be addressed in order to retrieve pixel data from the memory.

In an illustrated embodiment, the prediction area is smaller than a tile. Thus, the height H of the prediction area is less than the height M of a tile. Similarly, the width W of the prediction area is less than the width N of a tile. In a preferred embodiment, the dimensions M and N are selected such that the ratio of M:N approximates the ratio of H:W. Within each tile, the pixel data can be retrieved from the portion bounded by the prediction area in a zig-zag order.

Although tiles of chrominance data from the prior video frame are stored separately from corresponding tiles of luminance data, the storage and retrieval of the chrominance tiles is accomplished in the same manner as the luminance tiles. Thus, the chrominance data will be allocated into tiles that each fill one row of the RAM. Like the luminance tiles, the chrominance tiles can be addressed in a zig-zag order.

Apparatus is provided for addressing a random access memory of a video decompression processor to reduce the number of different rows of the RAM that must be addressed in order to retrieve pixel data necessary to reconstruct a current video frame from a prior video frame represented by the pixel data. Means are provided for allocating the pixel data representing the prior video frame into a plurality of tiles. Each tile contains an amount of data substantially corresponding to the capacity of a single row of the RAM. A memory manager generates write addresses for writing the tiles into the RAM on a one tile per row basis. A motion vector decoder is coupled to receive motion vectors associated with compressed current frame video data. The motion vector decoder decodes the motion vectors to determine the locations of prediction areas within the prior video frame. A prediction address generator associated with the memory manager is responsive to the motion vector decoder for generating read addresses for reading pixel data within the prediction areas from the RAM. If a prediction area encompasses more than one of the tiles of the video frame, the memory manager provides the read addresses in an order that retrieves all of the pixel data from one tile bounded by the prediction area before proceeding to retrieve the pixel data from any other tile bounded by that prediction area. In this manner, all of the pixel data bounded by the prediction area is retrieved from the RAM one row at a time to minimize the addressing of different rows in the RAM.

The memory manager can provide the read addresses for prediction areas that bound more than one tile in a zig-zag order within each separate tile. Further, the RAM can have a 32-bit data bus for writing data thereto and reading data therefrom. Means can be provided for identifying vertical and horizontal "page" boundaries between the rows of pixel data stored in the RAM. Such identifying means are operatively associated with the memory manager to facilitate the generation of the read addresses when a prediction area encompasses more than one tile of the video frame.

In a preferred embodiment, at least one rate control buffer is provided to buffer data output from the RAM. Ideally, each separate process requiring access to the RAM data is provided with a small FIFO serving as a rate control buffer between the process and the memory manager.

In addition, means can be provided to monitor the writing and reading of data stored in the RAM. Means responsive to the monitoring means temporarily suspend the decoding of new pixel data to be written into the RAM if the new pixel data would overwrite pixel data stored in the RAM that is required for display.

As indicated above, the RAM may be accessed to provide data for a plurality of video decoding processes. In this instance, the memory manager services each of the video decoding processes with a different priority. The priority assigned to each different decoding process will depend on the data access requirements of that process.

DETAILED DESCRIPTION OF THE INVENTION

Figure 1:
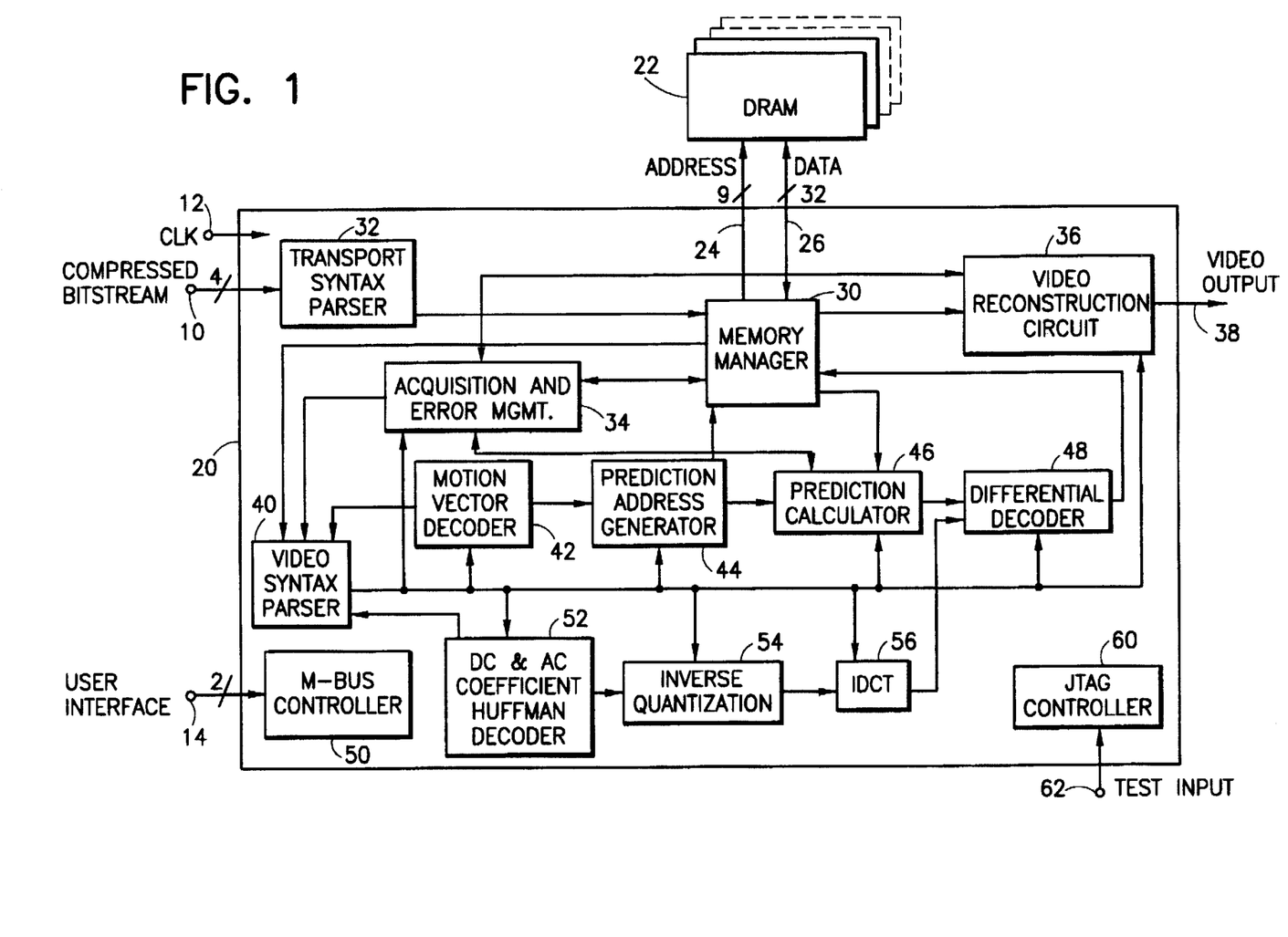
FIG. 1 is a block diagram of a video decompression processor in accordance with the present invention.

FIG. 1 is a block diagram of a video decompression processor incorporating a memory manager 30 that addresses external DRAM 22 in accordance with the present invention. The processor, generally designated 20, is a pipe-lined processor designed to decode both the transport layer (i.e., control and other non-video information) and the video layer of the compressed bitstream input via terminal 10, sometimes referred to as the "transport packet interface" of the video processor.

A user processor interface is provided at terminal 14 for control of the video data processor via an M-bus controller 50 that configures various registers in processor 20. The M-bus is a two-wire, bidirectional serial bus which provides a simple and efficient means of data exchange between devices, and is fully compatible with the I²C bus standard.

An interface to the DRAM 22 is provided via address lines 24 and data lines 26. In the specific embodiment illustrated in FIG. 1, DRAM 22 has a nine bit address port and a thirty-two bit data port.

A video output interface 38 is provided for the decompressed, reconstructed video which may, for example, be output as a standard CCIR (International Radio Consultive Committee) 656, eight bit, twenty-seven MHz multiplexed luminance (Y) and chrominance (Cr, Cb) signal.

A test interface can be provided via terminal 62 to a conventional JTAG (Joint Test Action Group) controller 60. JTAG is a standardized boundary scan methodology used for board-level testing to detect faults in package and board connections, as well as internal circuitry.

The video decompression processor 20 receives a clock signal via terminal 12. The clock provides timing information for, e.g., enabling a transport syntax parser 32 to recover timing information and video information from transport packets in the compressed bit stream input via terminal 10. An acquisition and error management circuit 34 utilizes a program clock reference (PCR) and decode time stamp (DTS) detected by a video syntax parser 40 to synchronize the start of picture decoding. This circuit sets vertical synchronization and provides global synchronization for all video decode and display functions.

The video layer is buffered in an input buffer (FIFO) configured in the external DRAM 22 by memory manager 30. The video syntax parser 40 receives the compressed video data output from the DRAM FIFO via memory manager 30, and separates the motion vector information from the coefficients describing the video information. The coefficients are processed by a Huffman decoder 52, inverse quantizer 54, and inverse discrete cosine transform (IDCT) processor 56.

Motion vectors are recovered and used to address previously decoded video frames required for reconstructing a current video frame. In particular, a motion vector decoder 42 decodes the motion vectors received from video syntax parser 40 and passes them to a prediction address generator 44. The prediction address generator provides address information necessary to retrieve, via memory manager 30, the necessary anchor frame data to enable prediction calculator 46 to provide a prediction data necessary to reconstruct a current frame block. Differential decoder 48 combines the prediction data with the decoded coefficient data to provide decompressed video data. The decompressed data is stored in appropriate buffers of DRAM 22 via memory manager 30.

It should be appreciated that the video decompression process carried out by motion vector decoder 42, prediction address generator 44, prediction calculator 46, differential decoder 48, Huffman decoder 52, inverse quantizer 54 and IDCT 56 are conventional and well understood by those skilled in the art. These components do not provide any part of the present invention.

Memory manager 30 schedules all activity on the external DRAM address and data buses 24, 26 and efficiently addresses DRAM 22 in accordance with the present invention. The memory manager insures that the data transfer requirements of the input FIFO portion of DRAM 22, the video syntax parser 40 and the video reconstruction circuit 36 (as well as prediction calculator 46 and differential decoder 48) are all met. The video reconstruction circuit 36 calculates a current picture and inserts closed caption, a vertical interval test signal (VITS) and test pattern data for Output on video output line 38. The output display is synchronized by comparing the PCR to a presentation time stamp (PTS). A determination of when the decoding and display of a video frame must commence is made by comparing a decode time stamp (DTS) to the PTS.

The memory manager also provides a variable size for the FIFO portion of DRAM 22 depending on the decoding mode, which can be, for example, NTSC or PAL with or without bidirectional prediction frames (B-frames). The video buffer control ensures that the FIFO provided by DRAM 22 does not overflow or underflow. Buffer control is a function of system timing parameters including the PCR and DTS.

DRAM 22 is illustrated as an external memory and may be provided by a plurality of DRAM chips, such as two, four Mbit (megabit, i.e., 220 bits) DRAMs for an eight Mbit implementation or four, four Mbit DRAMs for a sixteen Mbit implementation. It should be appreciated that in future implementations, and as memory technology advances, DRAM 22 may be provided as internal memory within the video decompression processor. The DRAM is mapped to provide various decode and output video buffers as well as a circular FIFO for the compressed input video bitstream. The DRAM may also be used to provide a test pattern buffer, a VITS buffer and a closed captioning display reordering buffer as well as to store various picture structure data necessary to properly display the decoded video frames. The DRAM can be reinitialized via memory manager 30 to provide different memory maps as required when variables are modified such as the video frame vertical size, PAL or NTSC video, the presence of test patterns, eight or sixteen Mbit memory configuration, and whether B-frames are present.

The memory manager 30 schedules all of the activity on the external DRAM buses including the data transfer requirements of the input FIFO, the video parser and the video reconstruction circuit. The memory manager also performs the required DRAM refresh in a conventional manner. For example, the same row in each of two or four external DRAMs can be refreshed simultaneously.

A small amount of FIFO can be provided as a rate flow buffer between the memory manager 30 and each of the components that accesses data from DRAM 22. For example, video syntax parser 40 contains a small rate flow buffer in the path which receives data from DRAM 22 via memory manager 30. The video syntax parser requires a new data word fairly infrequently. However, when a new word is required the parser must have it immediately. Otherwise, downstream processes that require an output from the video syntax parser sit idle, reducing the efficiency of the video decompression processor. If video syntax parser 40 were to make individual requests to the DRAM each time it needed a new data word, a slow random access would result and the parsing process would be delayed. The provision of the rate flow buffer overcomes this potential problem. If, for example, the rate flow buffer can hold twenty words of DRAM data, the video syntax parser will be able to obtain a new data word that it requires immediately from the rate flow buffer. When the rate flow buffer reaches a certain preset level of emptiness, memory manager 30 is directed to read more data from the RAM. When the request for more DRAM data is serviced, the data is read in a sequential burst and stored to the rate flow buffer until it is full.

The rate flow buffer helps DRAM I/O bandwidth and decoder speed because accesses are sequential and fast, usually within the same row of the DRAM, and the parser rarely runs out of data. More particularly, a request can be put in for new data before the rate flow buffer has emptied completely.

When a compressed bitstream is input to terminal 10 of video decompression processor 20, video frames represented by the bitstream are reconstructed one at a time. Initially, a full frame of video data will have to be received and stored in DRAM 22. Information for subsequent video frames can comprise a subset of the full video frame which, when added to prediction data from the prior video frame (stored in DRAM 22) will result in the reconstruction of a full frame. As each new I or P video frame is reconstructed, it is stored in DRAM 22 for use as an anchor frame necessary to reconstruct a subsequent frame represented by data in the compressed bitstream and for display at the appropriate time in the video sequence. As each B-frame is reconstructed, it is stored for display at the appropriate time. The present invention takes advantage of the fact that a majority (i.e., approximately 80%) of the data accessed from DRAM 22 is made on rectangular "prediction areas" of pixels. In the illustrated embodiment, each prediction area is nine pixels high by seventeen pixels wide. The use of a prediction area of this size (instead of an 8×16 pixel area) enables subpixel interpolation to be accomplished since one row and one column is added to a set of two 8×8 pixel blocks. The ratio of height to width (9:17) of the prediction area is approximately 0.53. In order to minimize the number of row crossings necessary when addressing DRAM 22, prior frame data is stored in the DRAM on the basis of tiles that have a similar ratio of height to width (e.g., about 0.50). An allocation of tiles within a video frame that can be used in accordance with the present invention is illustrated in FIG. 2.

Figure 2:
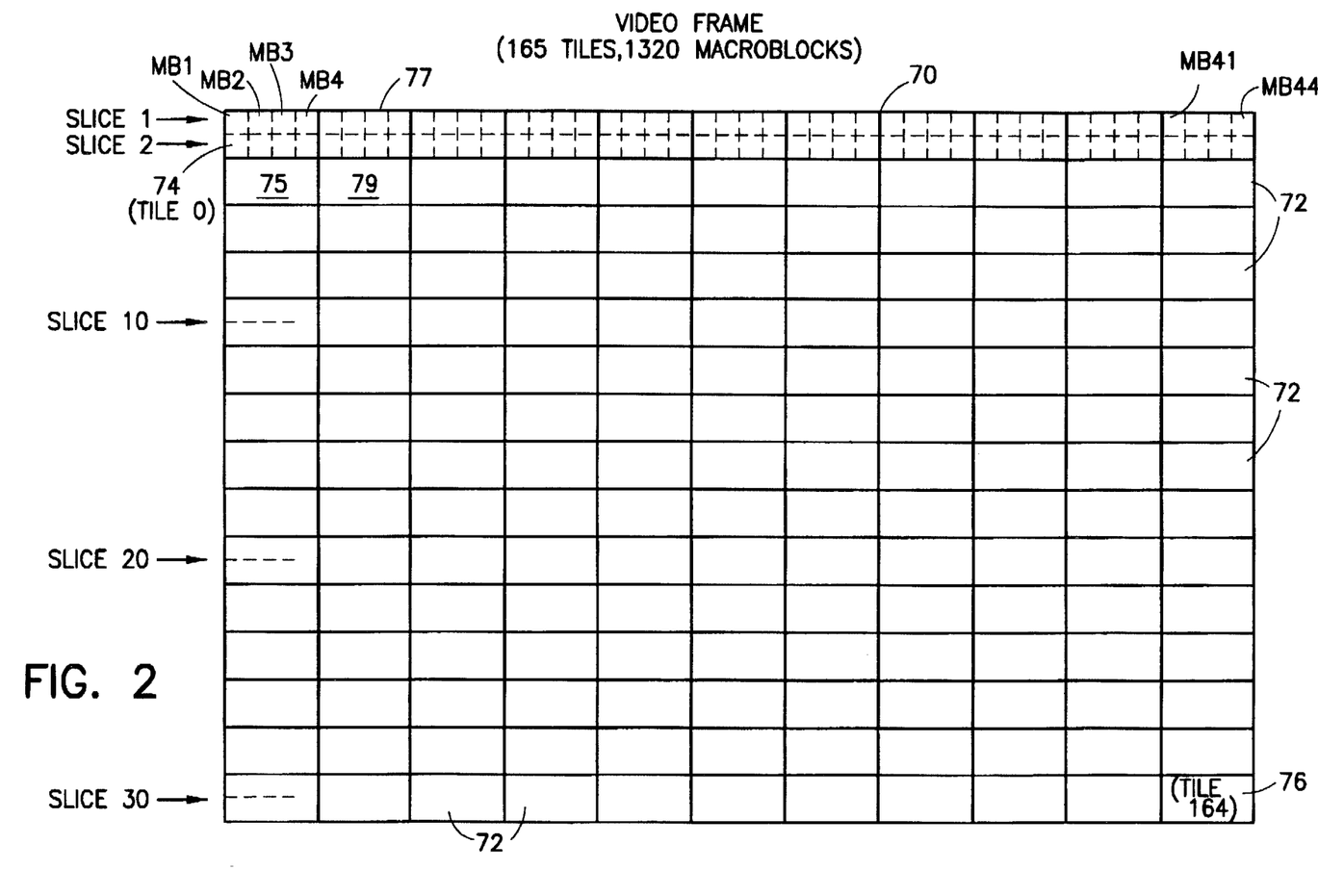
FIG. 2 is a diagrammatic illustration showing how one luminance video frame is divided into tiles in accordance with the present invention.

As shown in the example of FIG. 2, a luminance NTSC video frame 70 is divided into 165 "tiles" of equal size. Each tile 72 contains eight macroblocks (MB) in two slices of four macroblocks each. The 165 tiles are organized in an array of fifteen rows, each row containing eleven tiles. Each row contains two slices, for a total of thirty slices within each video frame. Each slice contains 44 macroblocks. Since there are 165 tiles, each containing 8 macroblocks, there a total of 1320 macroblocks in each NTSC video frame. Each luminance macroblock contains four blocks of 8×8 pixels. Each pixel comprises 8 bits of data. The video frame is divided so that each tile will contain the amount of data that can be held in one row of DRAM 22. It should be appreciated that somewhat different specifications will result for other television formats (e.g., PAL or SECAM) using the same fundamental principles.

In the embodiment illustrated, each row of DRAM 22 holds 512 thirty-two bit words for a total of 16,384 bits. Thus, each tile 72 of the video frame should also contain 16,384 bits. Since each macroblock contains four 8×8 pixel blocks, the macroblock comprises 256 eight bit pixels for a total of 2,048 bits per macroblock. Each tile contains eight such macroblocks, for a total of 16,384 bits. Thus, each tile 72 of the luminance video frame illustrated in FIG. 2 maps to one row of DRAM 22.

Figure 3:
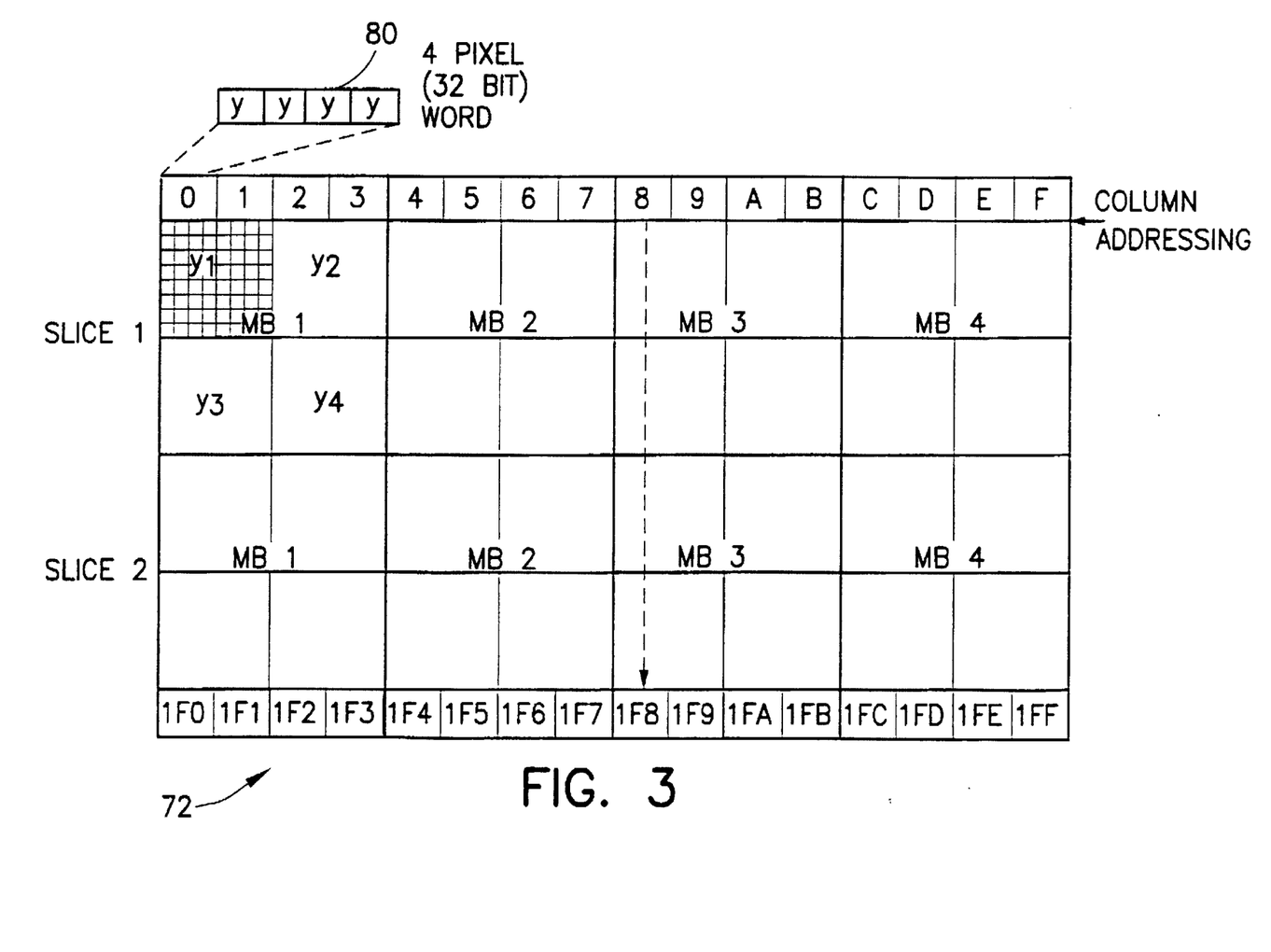
FIG. 3 is a diagrammatic illustration of one luminance tile.

FIG. 3 illustrates one luminance tile in greater detail. As shown, the luminance tile comprises portions of two different slices of the video frame. Four macroblocks (each containing four 8×8 luminance blocks) are provided in each slice portion. Since each DRAM location stores one thirty-two bit word, four eight bit luminance pixels (Y) can be stored in each DRAM location as illustrated by the four pixel word 80 in FIG. 3. As previously noted, there are 512 columns in each row of the DRAM, each accessible by one of the hexadecimal RAM addresses 0–1FF.

Figure 4:
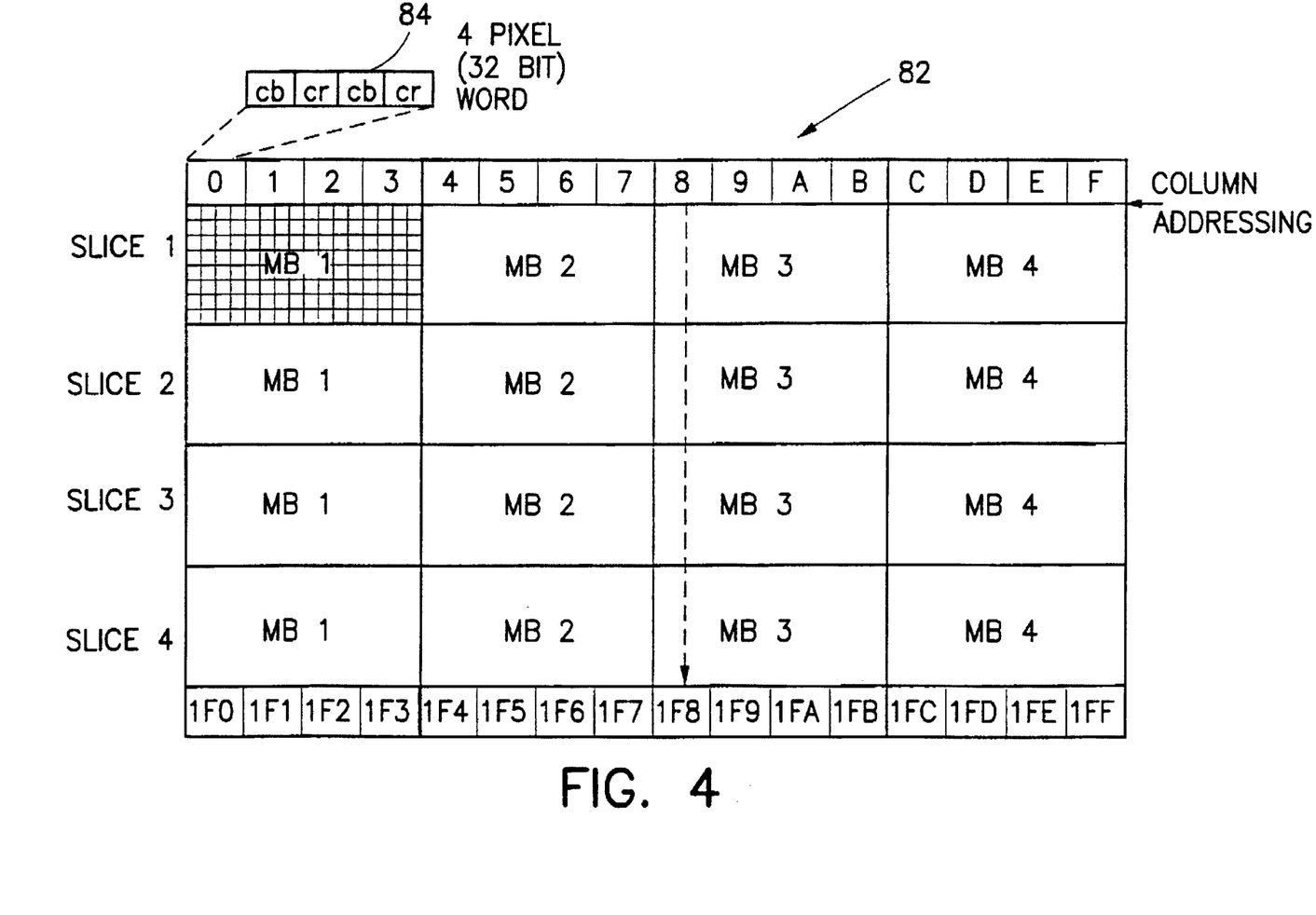
FIG. 4 is a diagrammatic illustration of one chrominance tile.

The chrominance data is handled similarly, except that each video frame contains half as much chrominance information as luminance information. Therefore, as illustrated in FIG. 4 each chrominance tile 82 contains portions from four slices of the video frame, each slice portion containing four chrominance macroblocks. The chrominance macroblocks are half the size of the luminance macroblocks, and therefore instead of eight macroblocks per tile, a chrominance tile contains sixteen macroblocks. Like the luminance tiles, each chrominance tile maps to one row of DRAM 22. In a preferred implementation, DRAM 22 is divided into separate areas for storing the luminance data and the chrominance data, with the chroma sections generally one half the size of the luminance sections. As illustrated by the four pixel word 84, the chrominance data is stored as alternating cb and cr chrominance components.

Figure 5:
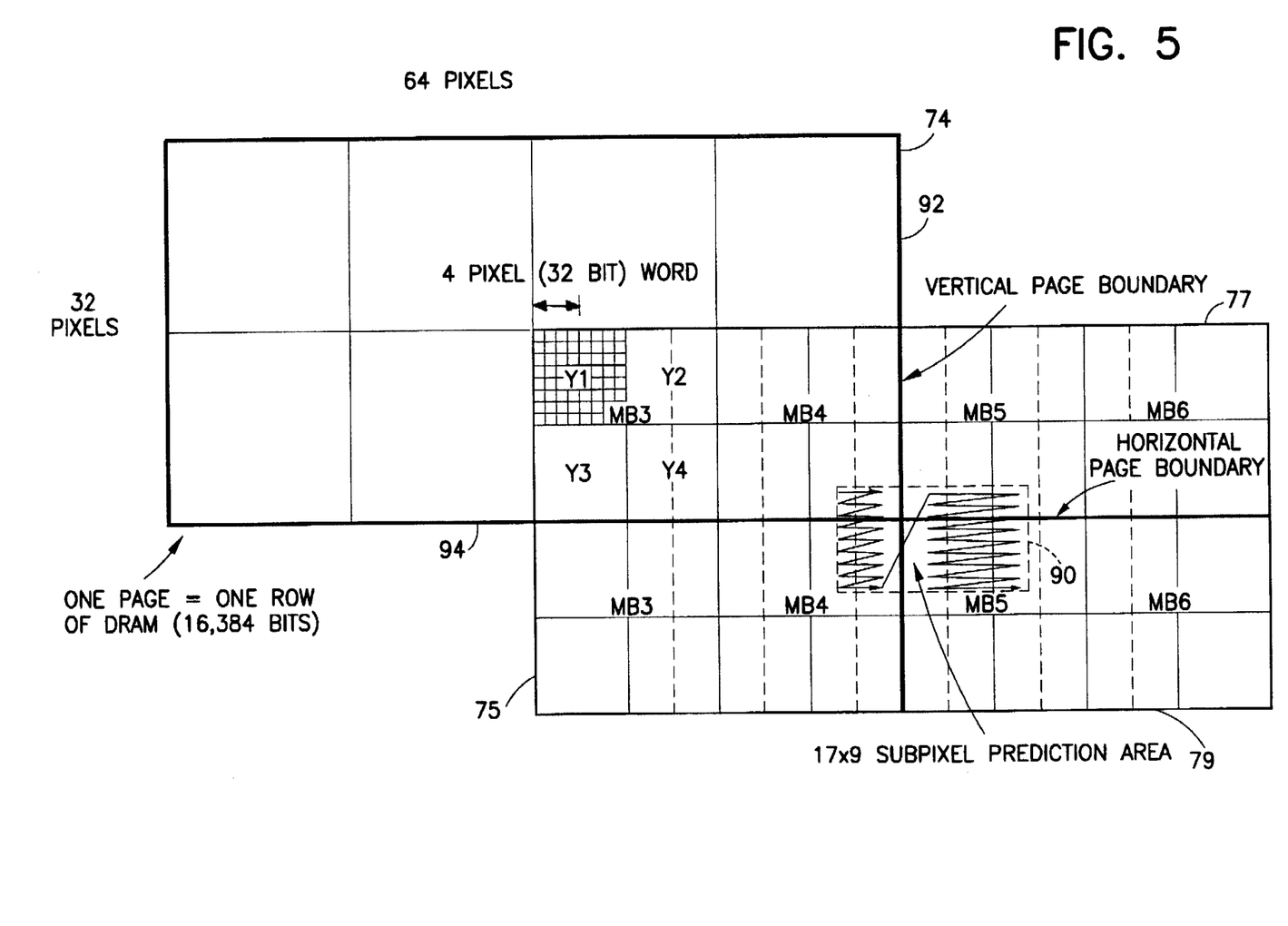
FIG. 5 is a diagrammatic illustration of a worst case condition wherein the reading of data from a prediction area requires four different memory rows to be accessed.

FIG. 5 illustrates how the one tile per row mapping of the present invention can be used to minimize the number of memory row address changes necessary in order to read a group of pixels within a prediction area from the DRAM. Portions of the four adjacent tiles 74, 75, 77 and 79 (from the upper left hand corner of video frame 70 of FIG. 2) are illustrated in FIG. 5. For simplicity, all of tile 74 is illustrated in FIG. 5, but only portions of tiles 75, 77 and 79 are shown. The vertical intersection of tiles 74, 75, 77 and 79 is along a vertical "page" boundary 92 of DRAM 22. The horizontal intersection of these tiles is along a horizontal "page" boundary 94 of the DRAM. Since one tile is stored in each row (i.e., "page") of DRAM 22, it is necessary to address a new row of the DRAM each time a vertical or a horizontal page boundary is crossed.

In order to predict the pixel data for a current frame from pixel data of a previous frame stored in DRAM 22, the previous frame pixels will be read from a predetermined prediction area for each group of pixels to be predicted in the current frame. The prediction area for each group of pixels is located using motion vectors transmitted with the compressed video data in a conventional manner. A worst case prediction area 90 is illustrated in FIG. 5. Prediction area 90 represents a worst case scenario because it covers pixels from four different tiles. If this prediction area were to be read, for example, by simply scanning consecutive rows therewithin, it would be necessary to repeatedly cross the vertical page boundary 92, thereby accessing different rows of the DRAM. This would significantly reduce the speed at which the data could be read from the DRAM.

In accordance with the present invention, the prediction area 90 is scanned in a manner which only requires four DRAM row addressing steps, i.e., a new row address is only required once for each of tiles 74, 75, 77 and 79 contained in the prediction area. In order to accomplish this, all of the data from each tile is read before proceeding to the next tile. The particular embodiment illustrated uses a zig-zag scanning pattern commencing at the upper left corner of the prediction area to retrieve all of the data from tile 74 which resides within prediction area 90. Then, the row of DRAM 22 containing tile 75 of the video frame is scanned until all of the data within the prediction area from that tile is retrieved. The DRAM row corresponding to tile 77 is then accessed, and all of the data residing in tile 77 within prediction area 90 is retrieved. Finally, the DRAM row containing tile 79 is accessed and all of the data within prediction area 90 for that tile is retrieved. Thus, instead of repetitively accessing different rows within the DRAM, in the worst case only four DRAM row accesses need to be made for recovering the data from an entire prediction area.

FIGS. 6–10 illustrate how data from the prediction area can be scanned depending on where the vertical page boundary resides within the prediction area. It should be appreciated that the examples shown in FIGS. 6–10 are for illustration only, and that many other scanning patterns could be used in accordance with the invention to read all of the data from each tile before proceeding to the next tile, thereby minimizing the number of row accesses required within the DRAM.

Figures 6, 7, 8:
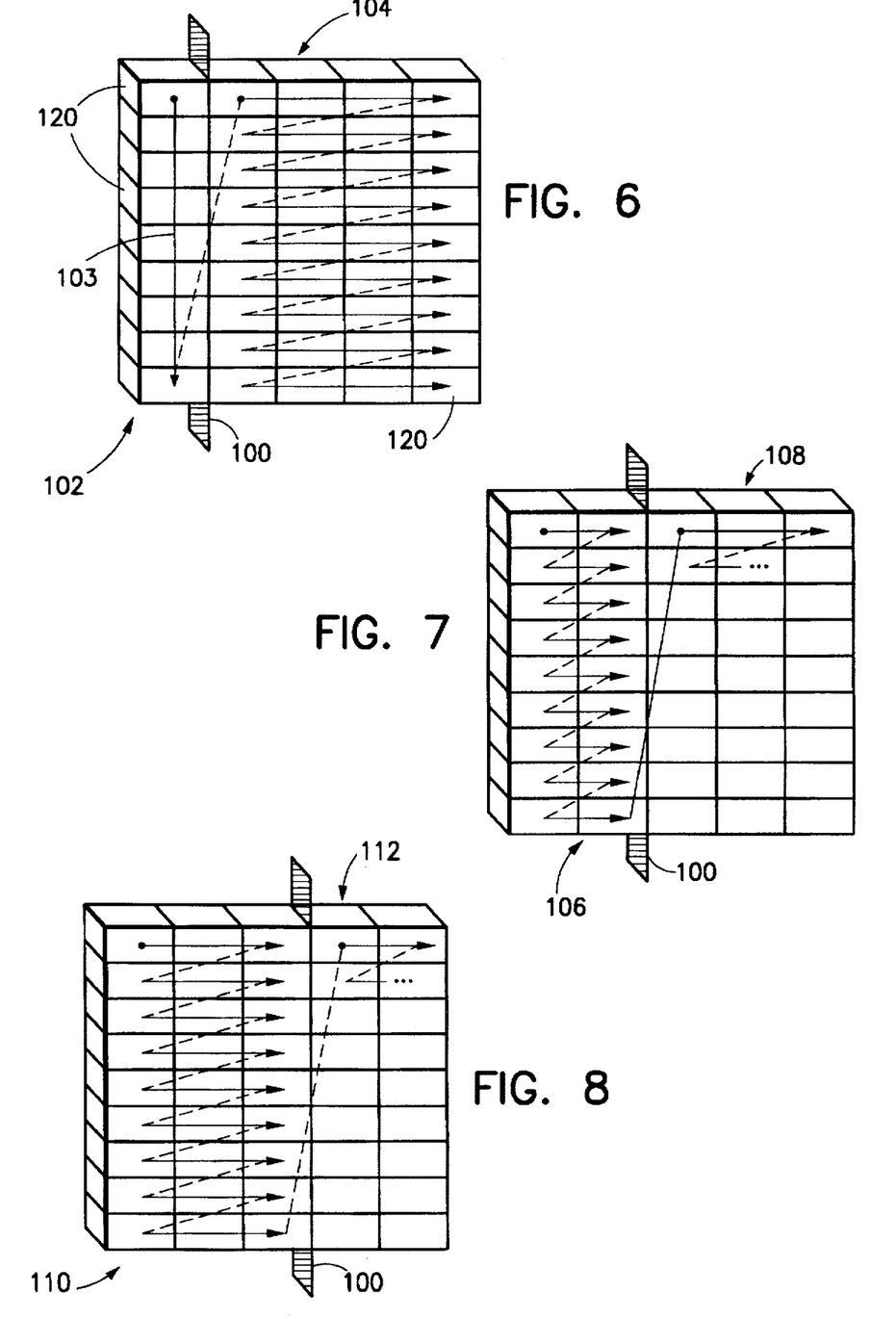
FIGS. 6 to 10 are diagrammatic illustrations showing how portions of data within a prediction area can be scanned depending on the location of a vertical page boundary.
Figure 9:
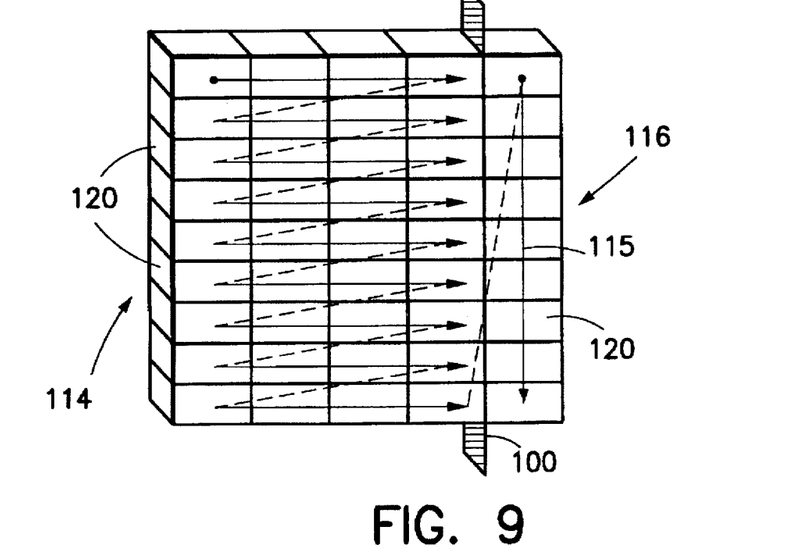
Figure 10:
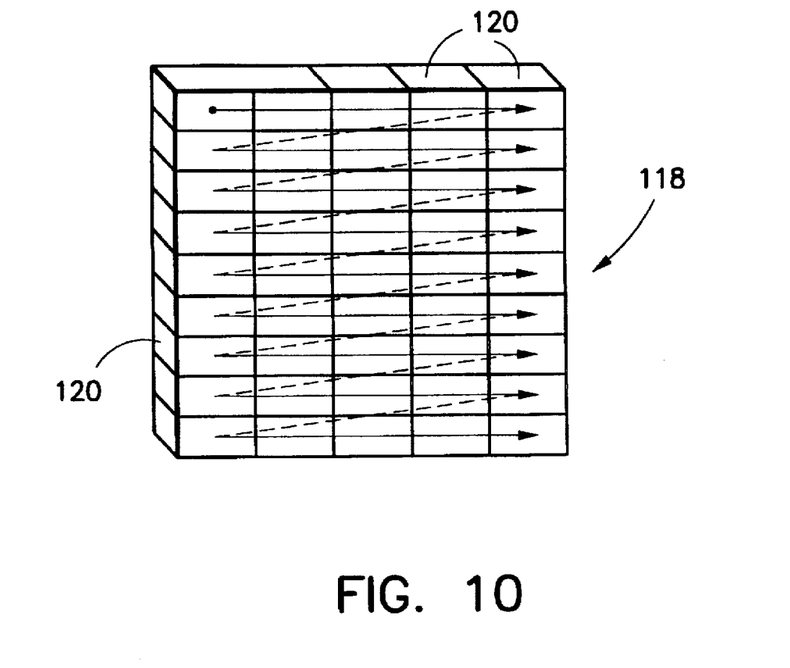

In FIGS. 6–10, each block 120 represents a four pixel word from a tile of a video frame. The vertical page boundary (corresponding to a row change in the DRAM in which the tile is stored) is designated by reference numeral 100. In FIG. 6, the prediction area of concern encompasses the last column of tile 102 and up to the first four columns of tile 104. It should be noted that for a prediction area that is nine pixels high and seventeen pixels wide, five, four-pixel wide columns (as shown, e.g., in FIG. 6) are sufficient to accommodate the width of the prediction area. Thus, where the vertical page boundary 100 is located as illustrated in FIG. 6, the data within the prediction area can be recovered by first reading all of the pixels in tile 102 in the direction of arrow 103, and then addressing the DRAM row containing tile 104 and scanning the applicable data from tile 104 in a zig-zag manner as illustrated.

Where the vertical page boundary 100 is located as illustrated in FIG. 7, the data from tile 106 is first read in a zig-zag manner as illustrated, and then the row containing tile 108 is addressed to read the data from tile 108 in the zig-zag order shown. If the vertical page boundary 100 is located as illustrated in FIG. 8, the data can be read from tile 110 in the order shown, and then from tile 112.

Where the page boundary 100 is located as illustrated in FIG. 9, the data can be read from tile 114 in the zig-zag order illustrated, and then the row of DRAM 22 containing tile 116 can be accessed to read the pertinent data therefrom as illustrated by arrow 115. In FIG. 10, an example is provided where there is no vertical page boundary within the prediction area. The entire prediction area resides within tile 118. Thus, the data can be read in any order, such as the zig-zag order shown.

It is emphasized that the horizontal scanning order illustrated in FIGS. 6–10 is only an example and that other techniques, such as vertical scanning, could just as easily be used in accordance with the present invention. The main criteria is that all of the data from one tile is read before crossing the boundary into another tile.

Figure 11:
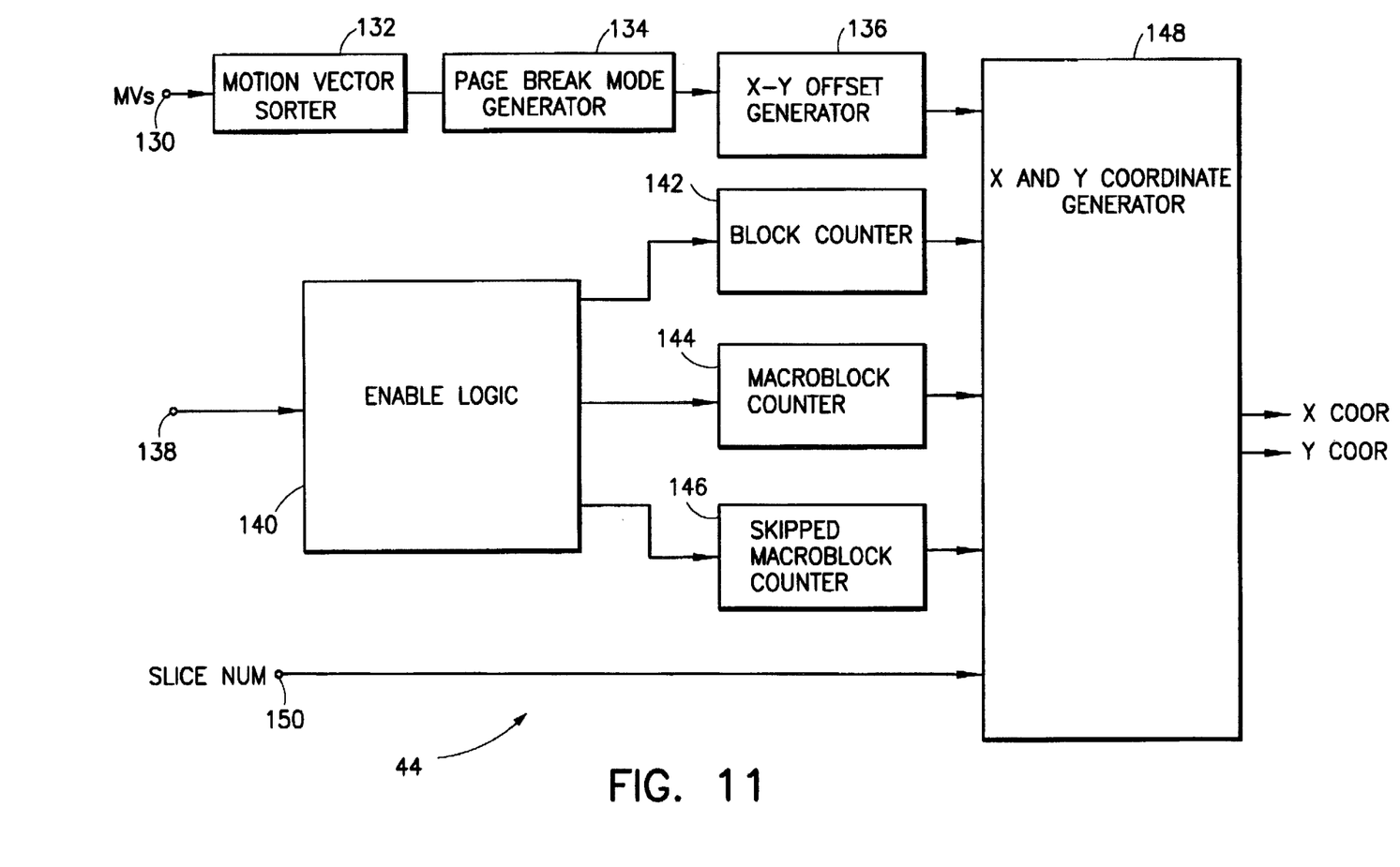
FIG. 11 is a block diagram of a prediction address generator in accordance with the present invention.

FIG. 11 is a block diagram of one embodiment of prediction address generator 44 (FIG. 1) that can be used in accordance with the present invention. Motion vectors (MVs) parsed from the compressed bit stream by the video syntax parser are input to a motion vector sorter 132 via terminal 130 of the prediction address generator 44. The motion vector sorter multiplexes the correct motion vectors at the appropriate time. Up to six different sets (x and y) of motion vectors can be used for a specific prediction, depending on the prediction mode used. Examples of different prediction modes that can be used according to the MPEG and/or DCII standards are predictive frame, predictive field, special frame, special field, B-frame (frame or field) and dual prime modes.

After the motion vectors are sorted, they are input to a page break mode generator 134 that determines where the vertical page boundary, if any, for the current prediction area will be. The starting address which is needed by the page break mode generator can be expressed in Verilog code as follows:

x_start_coord[9:0]={mb_num[5:0], 4'h0}+selected_mvx[10:1]

where x_start_coord is the starting x coordinate (i.e., horizontal direction) of the prediction pixel. In order to identify whether interpolation is to be used, a "subpel bit" is provided. The selected_mxv[0] is the subpel bit. In a preferred embodiment, the subpel bit is the least significant bit (LSB) of the motion vector, and if set to a binary "1", interpolation is used. All possible page breaks, and the codes identifying them, are shown in the following table:

TABLE

| Code | Patterns |
|---|---|
| 0 | XXXX |
| 1 | XIXXX |
| 2 | XXIXX |
| 3 | XXXIX |
| 4 | XXXXX |
| 5 | XIXXXX |
| 6 | XXIXXX |
| 7 | XXXIXX |
| 8 | XXXXIX |

In the table, "X" designates a word of four pixels and "l" designates the location of a vertical page break. Since a page contains four macroblocks in the horizontal direction, the location of each vertical page break can be determined from the six LSBs of x_start_coord and the subpel bit (selected_mvx[0]).

After any vertical boundary for a prediction area is located, an x-y offset generator 136 establishes a scanning mode (as illustrated in FIGS. 5-10) in order to minimize the number of row changes necessary in addressing the DRAM that stores the prediction data. The operation of the x-y offset generator is described in greater detail below in connection with FIG. 12.

Enable logic 140 responds to various signals input to terminal 138. These signals include the macroblock number, block number, whether field or frame based motion compensation is used, a motion vector count and a slice synchronization signal, as well as information defining which of the prediction modes is being used. The current slice number is input via terminal 150 directly to an x and y coordinate generator 148, that also receives the outputs from the x-y offset generator 136, a block counter 142, a macroblock counter 144 and a skipped macroblock counter 146. The operation of the x and y coordinate generator can be expressed in Verilog code as follows:

```
x_coord[9:0] = {mb_num[5:0],4'h0} + selected_mvx[10:1] + x_offset if (chroma_mode) { y_coord[9:0] = {1'b0,slice_num,fr_b_num,2'h0} +

{{4{selected_mvy[7]}}, selected_mvy[6:1]} + sc_y_offset} else { y_coord[9:0] = {slice_num,fr_b_num,3'h0} +

{{4(selected_mvy[7]}}, selected_mvy[6:1]} + sc_y_offset
``` where slice_num is slice_vertical_position−1; fr_b_num (1 bit) is high only in frame mode processing of the video data and when the second 2-block pair of the macroblock is being processed; and sc_y_offset is y_offset<<frame_mode. It is noted that in chrominance (chroma) mode, the motion vectors must be scaled up by a factor of two. Thus, if the luminance motion vector has a value of two, the motion vector will have a value of four for chrominance.

The block counter 142 counts the total number of blocks in the macroblock. This counter includes the number of blocks which needs to be fed back for averaging in B-frame, special prediction (DCII) and dual prime prediction modes. Block counter 142 is three bits wide and counts pairs of two 8×8 blocks within the macroblock, including the interpolating blocks. It is used to determine which motion vectors should be applied as well as when the chrominance data is being processed.

The macroblock counter keeps track of the number of the macroblock in the slice, and provides the mb_num which is needed to generate the x_coord. It is incremented once every macroblock header, and is reset to the macroblock number received at the beginning of each slice. The skipped macroblock counter counts the number of macroblocks that must be skipped in the event that an error has occurred in the received data. When a macroblock is skipped, the prediction address generator will zero out the motion vector for prediction or reuse the previous macroblock motion vectors when a B-frame prediction mode is used. At the same time, the block counter is readjusted to minimize the number of blocks required for averaging.

Figure 12A:
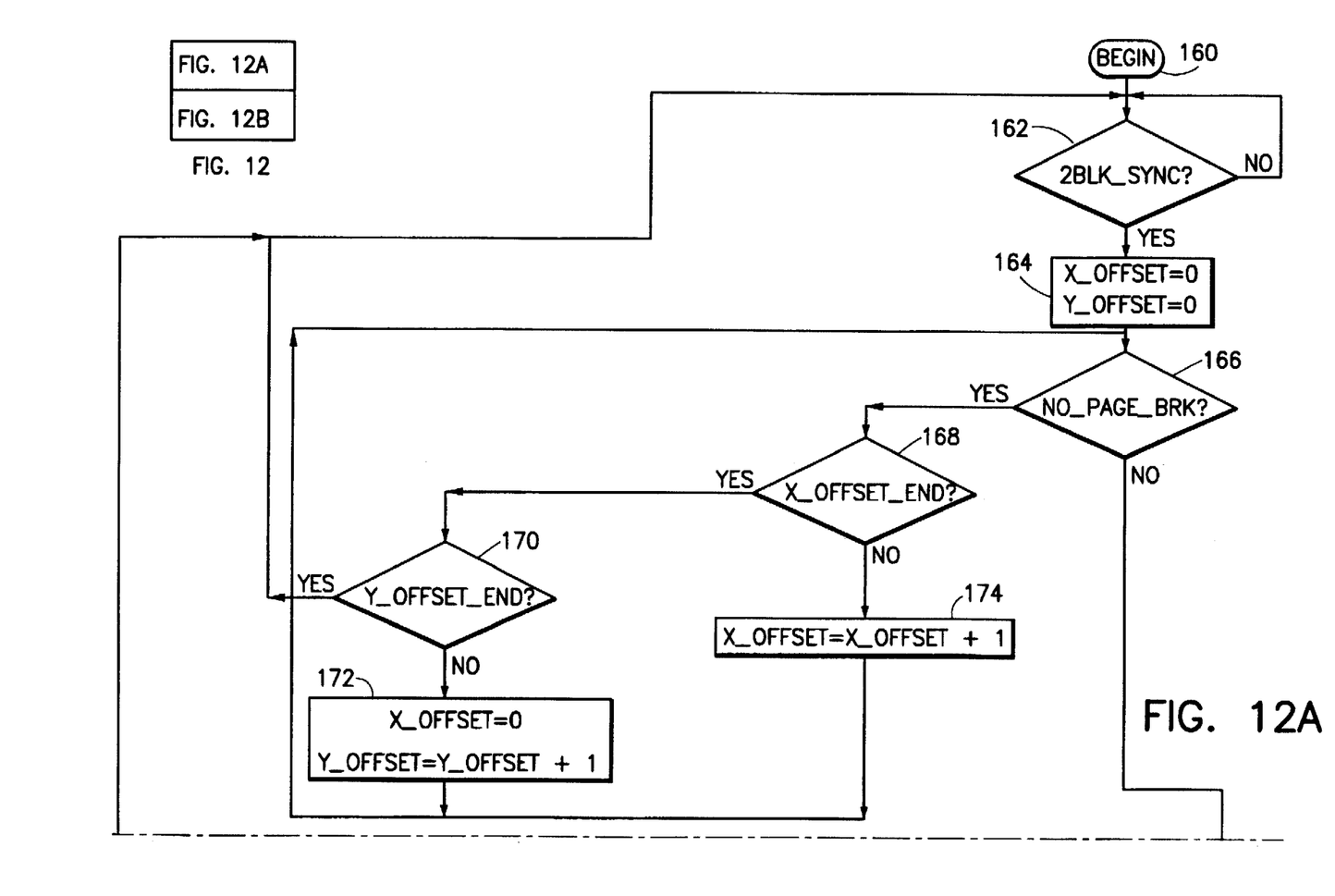
FIG. 12 is a flowchart illustrating a routine for implementing the memory reading scheme of the present invention.
Figure 12B:
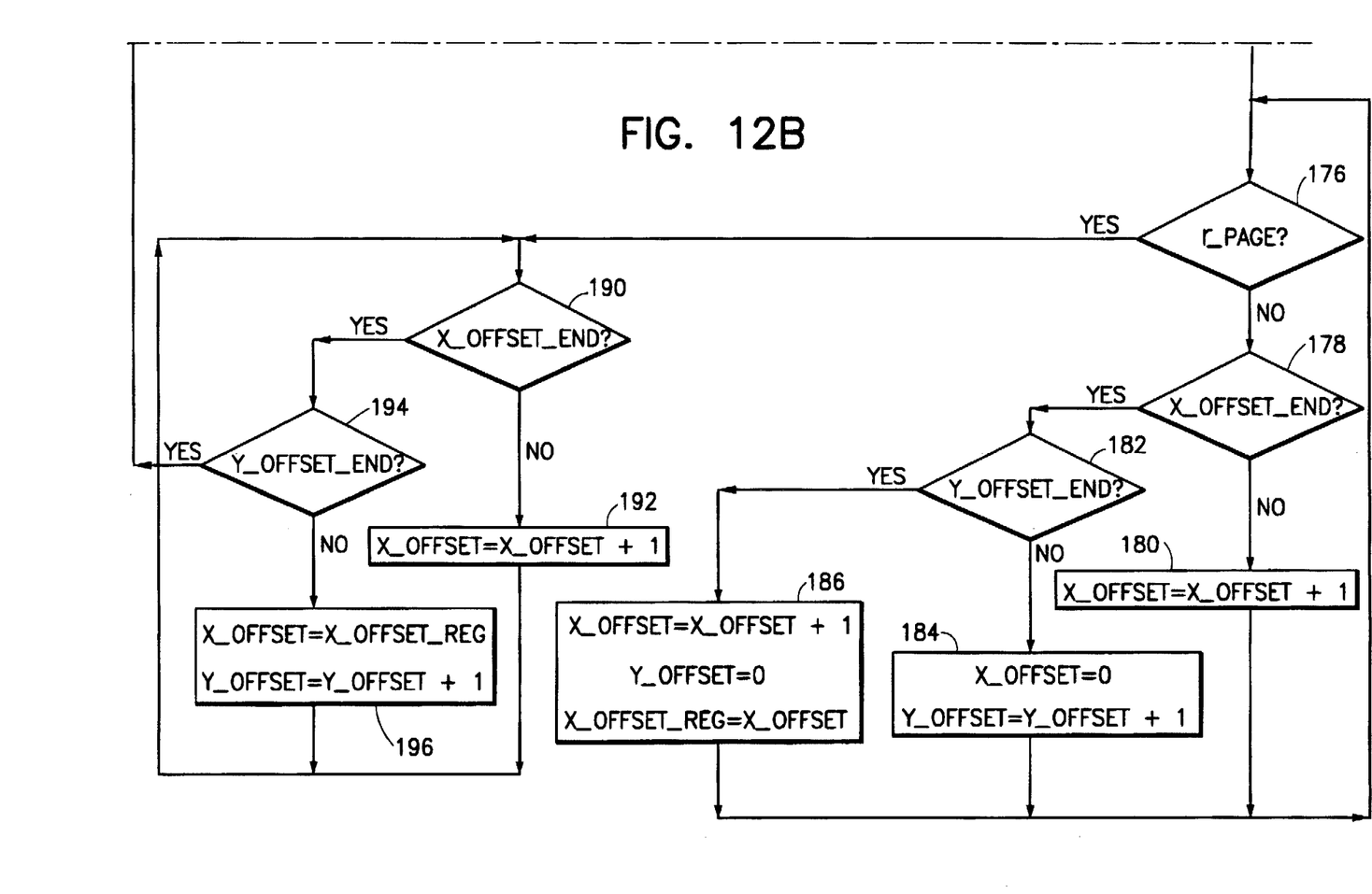

FIG. 12 is a flow chart illustrating the routine used by X-Y offset generator 136 to implement the memory reading scheme of the present invention. The routine begins at box 160, and passes to box 162 where a determination is made as to whether a sync pulse ("2blk_sync") has arrived indicating the beginning of the next pair of prediction data blocks within the prediction area. If not, the routine loops back to the top of box 162 until a "2blk_sync" pulse arrives. When this occurs, the x_offset and y_offset will be set to zero as indicated at box 164. These offsets are measured from the top left hand pixel in the prediction area.

At box 166 a determination is made as to whether there is a vertical page break in the prediction area. If not (no_page_brk=yes), a determination is made at box 168 as to whether the current word of four pixels is the last word in a horizontal row of pixels within the prediction area. If so (x_offset_end=yes), a determination is made at box 170 as to whether the word is also the last one in the vertical direction within the prediction area. If so (y_offset_end=yes), all of the pixel data for the prediction area has been retrieved and the routine passes back to box 162 to wait for the arrival of the next block pair. Otherwise, at box 172 the x_offset is returned to zero and the y_offset is incremented by 1, so that the next row of pixel data within the prediction area can be read. Since this portion of the routine deals with prediction areas in which there is no vertical page break for processing, the zig-zag scanning of pixel data will continue as illustrated in FIG. 10. Thus, at the end of each horizontal row within the prediction area, the DRAM will be addressed to read the first word from the next row. As the reading of the data progresses from the beginning of a row to the end of that row within the prediction area, the x_offset will be incremented by one, as indicated at box 174 of FIG. 12.

In the event there is a page break to contend with (no_page_brk=no), the routine will pass from box 166 to box 176 where a determination is made as to whether pixels are currently being read from the right hand side of the vertical page break; e.g., from page 104 of FIG. 6. If so, the routine continues at box 190 where a determination is made as to whether the end of the current row within the prediction area has been reached (x_offset_end=yes). If so, at box 194 a determination is made as to whether the last row in the prediction area has been read (y_offset_end=yes). If so, all of the pixels within the prediction area will have been read and the routine returns back to box 162. Otherwise, there are additional rows to be read to the right of the page break within the prediction area and, at box 196, the x_offset is set to the first word to the right of the page boundary (x_offset_reg) and the y_offset is incremented by 1 (y_offset=y_offset+1). In the event that box 190 determines that there are additional words to be read within the current row of the prediction area, at box 192 the x_offset is incremented by 1 (x_offset=x_offset+1). If box 176 of the routine determines that data is currently being read from the left side of a page break (e.g., from the portion of page 106 illustrated in FIG. 7) a determination is made at box 178 as to whether the last word before the page break has been read from the current row. If not, at box 180 x_offset is incremented by 1. If the last word of the row before the page break has just been read, then at box 182 a determination is made as to whether the last row of the prediction area has been processed (i.e., y_offset_end=Yes). If not, at box 184 the x_offset is returned to zero (the first word of a horizontal row within the prediction area) and the y_offset is incremented by 1. If, on the other hand, all of the pixels have been read from the left hand side of a page break (e.g., from page 106 of FIG. 7) it will necessary to cross over the page break to scan the portion of the prediction area to the right of the page break (e.g., from page 108 illustrated in FIG. 7). In order to do this, at box 186 the x_offset is incremented by 1 (to the right of the page break) and the y_offset is set back to zero (to the upper left hand word of the new tile within the prediction area). At the same time, x_offset_reg is set to x_offset, so that the reading of data from each subsequent row will commence just to the right of the page break.

As indicated above, the routine of FIG. 12 implements the zig-zag scanning orders illustrated in FIGS. 6-10. Other routines can, of course, be substituted to implement different scanning orders. Any scanning order adopted in accordance with the present invention will read data within a prediction area one tile at a time, to minimize the number of times that a page break must be crossed and thereby minimize the number of new pages (i.e., rows) that must be addressed in the random access memory storing the pixel data.

The writing of data into DRAM 22 and reading of data therefrom in order to decode and display video frames on a real time basis requires regulation of the decoding rate. Otherwise, data stored in the DRAM for display may be overwritten before it has been displayed. Thus, it is necessary to wait until the time prescribed by the DTS of a video frame before decoding of that frame can commence. If the video frame being decoded is destined for a circular buffer within DRAM 22, the decoding of a slice whose vertical position exceeds the vertical position of the line currently being displayed from the "last display field" (plus some rate flow buffering) cannot be allowed. The last display field is the last field of a video frame that is currently being displayed. This could be field 1 or field 2 of the video frame, depending, e.g., on whether a 3:2 pull down sequence is being used for film mode processing. The rate flow buffering simply comprises some extra lines that are added to the circular buffer, beyond those which are needed to store an entire video frame. The purpose of the rate flow buffer is to allow the decoder to get ahead when decoding an easy portion of the picture, so that the decoder does not get behind if a difficult video portion is encountered. This will avoid a situation where the system attempts to display data that is not yet fully decoded.

In order prevent the overwriting of data that is still required for display, acquisition and error management circuit 34 (FIG. 1) monitors, via memory manager 30, the writing and reading of data stored in the DRAM 22. In the event that the data being decoded is close to overwriting pixel data stored in the DRAM that is required for display, circuit 34 will instruct video syntax parser 40 to temporarily suspend the decoding of new pixel data until room is available for storage of the decoded data in DRAM 22. Suspension of decoding can be effected, for example, by inhibiting a state machine that is used to implement the video syntax parser. In this manner, new pixel data will not overwrite pixel data stored in the DRAM that is still required for display. Once the data required for display is output via video reconstruction circuit 36, the decoding process is recommenced and the newly decoded data is stored in DRAM 22 in the space made available by the data that has now been output for display.

It should now be appreciated that the present invention provides a technique for optimizing the utilization of random access memory bandwidth in a video decompression processor. Rate buffering, optimal address ordering, statistical averaging, arbitration of memory requests and handshaking between decoding subprocesses can all be used in order to achieve such optimization. The address ordering scheme of the present invention minimizes the number of rows that must be addressed within the memory when reading prediction data from a prediction area. The statistical averaging used in accordance with the invention allocates an entire frame's time in order to decode each frame of video data. Rate buffering of all processes accessing the memory enables memory accesses to be serviced efficiently. The prioritization of requests for DRAM access provides the necessary bandwidth to processes that are most data intensive while less data intensive processes are waiting. Handshaking enables processes requiring variable time to provide data to subsequent processes in a timely manner.

Although the invention has been described in connection with various specific embodiments, it should be appreciated that various adaptations and modifications may be made thereto, without departing from the spirit and scope of the invention as set forth in the claims.

What is claimed:

1. A method for storing and retrieving prediction area pixel data of successive video frames from a random access memory (RAM) to minimize the number of times that different rows of said RAM must be addressed, comprising the steps of:

storing pixel data of said video frames in said RAM as a plurality of tiles, wherein each tile has a height of M pixels and a width of N pixels and substantially fills a different row of said RAM;

decoding motion vector data to determine said prediction areas, each having a height equivalent to a vertical space occupied by H pixels and a width equivalent to a horizontal space occupied by W pixels;

providing a timing signal which defines consecutive access periods in which said prediction area pixel data may be retrieved from said RAM; wherein:

(a) when a selected video frame prediction area encompasses only one of said rows, addressing said RAM to retrieve the corresponding pixel data in a first of said access periods; decoding motion vector data to determine another prediction area, and addressing said RAM to retrieve the corresponding pixel data from one row of said RAM in a second of said access periods which directly follows said first access period; and         (b) when a selected video frame prediction area encompasses only two of said rows, addressing said RAM to retrieve the corresponding pixel data of the first of said rows in a first of said access periods, and to retrieve the corresponding pixel data of the second of said rows in a second of said access periods which directly follows said first access period; decoding motion vector data to determine another prediction area, and addressing said RAM to retrieve the corresponding pixel data from one row of said RAM in a third of said access periods which directly follows said second access period.

2. The method of claim 1 wherein, when said selected video frame prediction area encompasses only two of said rows, the two corresponding tiles are separated by a vertical page boundary in a physical pixel space.

3. The method of claim 1 wherein, when said selected video frame prediction area encompasses only two of said rows, the two corresponding tiles are separated by a horizontal page boundary in a physical pixel space.

4. The method of claim 1 wherein said prediction areas are smaller than said tiles, such that H<M and W<N, and said prediction areas are sized to allow subpixel interpolation among the pixels within the respective prediction areas.

5. The method of claim 1, comprising the further steps of:
when a selected video frame prediction area encompasses four of said rows, addressing said RAM to retrieve the corresponding pixel data of the first of said rows in a first of said access periods, to retrieve the corresponding pixel data of the second of said rows in a second access period which directly follows said first of said access periods, to retrieve the corresponding pixel data of the third of said rows in a third access period which directly follows said second access period, and to retrieve the corresponding pixel data of the fourth of said rows in a fourth access period which directly follows said third access period;
wherein the four corresponding tiles of said selected video frame prediction area are separated by a horizontal page boundary and a vertical page boundary in a physical pixel space.

6. The method of claim 5, comprising the further steps of:
decoding motion vector data to determine another prediction area; and
addressing said RAM to retrieve the corresponding pixel data from one row of said RAM in a fifth of said access periods which directly follows said fourth access period.

7. The method of claim 1, wherein:
at least one said successive video frames are provided in a field mode;
said storing step stores said pixels of said one of said successive video frames as at least one macroblock in a corresponding one of said tiles; and
said macroblock includes first and second sub-macroblocks which are subsets thereof.

8. The method of claim 7, comprising the further steps of:
addressing said RAM to retrieve prediction area data which includes pixel data in said first sub-macroblock in one of said access periods;
using the retrieved first sub-macroblock data in reconstructing a corresponding portion of one of said successive video frames;
addressing said RAM to retrieve prediction area data which includes pixel data in said second sub-macroblock in another one of said access periods; and
using the retrieved second sub-macroblock data in reconstructing a corresponding portion of said one of said successive video frames.

9. An apparatus for storing and retrieving prediction area pixel data of successive video frames from a random access memory (RAM) to minimize the number of times that different rows of said RAM must be addressed, comprising:
means for allocating the pixel data representing said video frames into a plurality of tiles;
a memory manager for generating write addresses for writing said tiles into said RAM on a one tile per row basis, wherein each tile has a height of M pixels and a width of N pixels and substantially fills a different row of said RAM;
a decoder, coupled to receive motion vectors associated with said video frames, for decoding motion vector data to determine said prediction areas, each having a height equivalent to a vertical space occupied by H pixels and a width equivalent to a horizontal space occupied by W pixels; ,
a prediction address generator which is responsive to said decoder for generating read addresses for said video frames for retrieving the prediction area pixel data thereof from said RAM;
timing means for providing a timing signal which defines consecutive access periods in which said prediction area pixel data may be retrieved from said RAM; wherein:
  (a) when a selected video frame prediction area encompasses only one of said rows, said prediction address generator generates read addresses to allow retrieval of the corresponding pixel data in a first of said access periods; said decoder decodes motion vector data to determine another prediction area; and said prediction address generator generates read addresses to allow retrieval of the corresponding pixel data from one row of said RAM in a second of said access periods which directly follows said first access period; and
  (b) when a selected video frame prediction area encompasses only two of said rows, said prediction address generator generates read addresses to allow retrieval of the corresponding pixel data of the first of said rows in a first of said access periods, and to retrieve the corresponding pixel data of the second of said rows in a second of said access periods which directly follows said first access period; said decoder decodes motion vector data to determine another prediction area, and said prediction address generator generates read addresses to allow retrieval of the corresponding pixel data from one row of said RAM in a third of said access periods which directly follows said second access period.

10. The apparatus of claim 9 wherein, when said selected video frame prediction area encompasses only two of said rows, the two corresponding tiles are separated by a vertical page boundary in a physical pixel space.

11. The apparatus of claim 9 wherein, when said selected video frame prediction area encompasses only two of said rows, the two corresponding tiles are separated by a horizontal page boundary in a physical pixel space.

12. The apparatus of claim 9, wherein said prediction areas are smaller than said tiles, such that H<M and W<N, and said prediction areas are sized to allow subpixel interpolation among the pixels within the respective prediction areas.

13. The apparatus of claim 9 wherein:
when a selected video frame prediction area encompasses four of said rows, said prediction address generator generates read addresses to allow retrieval of the corresponding pixel data of the first of said rows in a first of said access periods, to retrieve the corresponding pixel data of the second of said rows in a second access period which directly follows said first of said access periods, to retrieve the corresponding pixel data of the third of said rows in a third access period which directly follows said second access period, and to retrieve the corresponding pixel data of the fourth of said rows in a fourth access period which directly follows said third access period; and the four corresponding tiles of said selected video frame prediction area are separated by a horizontal page boundary and a vertical page boundary in a physical pixel space.

14. The apparatus of claim 13, wherein:

said decoder decodes motion vector data to determine another prediction area, and said prediction address generator generates read addresses to allow retrieval of the corresponding pixel data from one row of said RAM in a fifth of said access periods which directly follows said fourth access period.

15. The apparatus of claim 9, wherein:

at least one said successive video frames are provided in a field mode;

said memory manager generates write addresses to allow said pixels of said one of said successive video frames to be stored in said RAM as at least one macroblock in one of said tiles; and said macroblock includes first and second sub-macroblocks which are subsets thereof.

16. The apparatus of claim 15, wherein:

said prediction address generator generates read addresses to allow retrieval of prediction area data which includes pixel data in said first sub-macroblock in one of said access periods;

the retrieved first sub-macroblock data is used in reconstructing one of said successive video frames;

said prediction address generator generates read addresses to allow retrieval of prediction area data which includes pixel data in said second sub-macroblock in another one of said access periods; and the retrieved second sub-macroblock data is used in reconstructing said one of said successive video frames.

17. An apparatus for storing and retrieving prediction area pixel data of successive video frames from a random access memory (RAM) to minimize the number of times that different rows of said RAM must be addressed, wherein said video frames are provided in a field mode format, comprising:

means for allocating the pixel data representing said video frames into a plurality of tiles, each tile including at least one macroblock; wherein each macroblock is divided into first and second sub-macroblocks;

a memory manager for generating write addresses for writing said tiles into said RAM on a one tile per row basis, wherein each tile has a height of M pixels and a width of N pixels and substantially fills a different row of said RAM;

a decoder, coupled to receive motion vectors associated with said video frames, for decoding motion vector data to determine said prediction areas, each having a height equivalent to a vertical space occupied by H pixels and a width equivalent to a horizontal space occupied by W pixels; wherein said prediction areas are at least as large as said sub-macroblocks;

a prediction address generator which is responsive to said decoder for generating read addresses for said video frames for retrieving the prediction area pixel data thereof from said RAM;

timing means for providing a timing signal which defines consecutive access periods in which said prediction area pixel data may be retrieved from said RAM; wherein (a) when a selected video frame prediction area of said first field of one of said video frames encompasses only one of said rows, said prediction address generator generates read addresses to allow retrieval of the corresponding pixel data in a first of said access periods; said decoder decodes motion vector data to determine another prediction area of said first field of said one of said video frames; and said prediction address generator generates read addresses to allow retrieval of the corresponding pixel data from one row of said RAM in a second of said access periods which directly follows said first access period; and (b) when a selected video frame prediction area of said first field of one of said video frames encompasses only two of said rows, said prediction address generator generates read addresses to allow retrieval of the corresponding pixel data of the first of said rows in a first of said access periods, and to retrieve the corresponding pixel data of the second of said rows in a second of said access periods which directly follows said first access period; said decoder decodes motion vector data to determine another prediction area of said first field of said one of said video frames, and said prediction address generator generates read addresses to allow retrieval of the corresponding pixel data from one row of said RAM in a third of said access periods which directly follows said second access period.

18. The apparatus of claim 17, wherein:

when a selected video frame prediction area of said first field of one of said video frames encompasses four of said rows, said prediction address generator generates read addresses to allow retrieval of the corresponding pixel data of the first of said rows in a first of said access periods, to retrieve the corresponding pixel data of the second of said rows in a second access period which directly follows said first of said access periods, to retrieve the corresponding pixel data of the third of said rows in a third access periods which directly follows said second access period, and to retrieve the corresponding pixel data of the fourth of said rows in a fourth access period which directly follows said third access period; and said decoder decodes motion vector data to determine another prediction area of said first field of said one of said video frames, and said prediction address generator generates read addresses to allow retrieval of the corresponding pixel data from one row of said RAM in a fifth of said access periods which directly follows said fourth access period.

19. The apparatus of claim 17 wherein:

after the pixel data of said first field prediction areas of said one of said video frames have been retrieved; said decoder decodes motion vector data to determine prediction areas of said second field of said one of said video frames; and said prediction address generator generates read addresses to retrieve the corresponding pixel data from said RAM.

* * * * *